United States Patent
Haböck et al.

[11] 3,946,389
[45] Mar. 23, 1976

[54] CIRCUIT ARRANGEMENT FOR THE WIRELESS TRANSMISSION OF CONTROL SIGNALS TO THE CONTROL PATHS OF CONTROLLED SEMICONDUCTOR VALVES

[75] Inventors: Adolf Haböck, Uttenreuth, Germany; Oskar Beckmann, St. Pólten, Austria; Stefan Frese; Herbert Radda, both of Vienna, Austria; Franz Mayerhofer, Mödling, Austria; Karl-Friedrich Leowald, Weiher, Germany

[73] Assignee: Siemens Aktiengesellschaft, Munich, Germany

[22] Filed: Dec. 5, 1974

[21] Appl. No.: 529,723

[30] Foreign Application Priority Data
Dec. 5, 1973   Germany............................ 2360662

[52] U.S. Cl................................. 343/225; 343/228
[51] Int. Cl.² ......................................... H03K 17/00
[58] Field of Search.......... 343/225, 228; 340/171 R, 340/171 A; 325/390, 392, 393

[56] References Cited
UNITED STATES PATENTS
3,643,260   2/1972   Clarke ............................ 343/225
3,742,440   6/1973   Ehrlich ............................ 343/225 X Primary Examiner—Harold I. Pitts
Attorney, Agent, or Firm—Kenyon & Kenyon Reilly Carr & Chapin

[57] ABSTRACT

The invention concerns a circuit arrangement for the wireless transmission of control signals to the control paths of controlled semiconductor valves, particularly of thyristors, which are preferably usable in a rectifier for high voltage. The control signals are provided for the modulation of a high-frequency transmitter which is disposed at some distance from high frequency receivers each containing a demodulator, whose output signal is delivered to the control path of a semiconductor valve. In order to ensure reliable and interference-proof firing of the semiconductor valves, if the distance between the high-frequency transmitter and the high-frequency receiver is large, there is provided, a frequency-modulated high-frequency transmitter as the high-frequency transmitter. The carrier frequency of the frequency modulated transmitter is in the range of 10 MHz to 50 GHz and has a transmitting antenna provided with a reflector which is directed toward receiving antennas with which the individual high-frequency receivers are equipped. The demodulator contained in each high-frequency receiver comprises a filter which is tuned to the modulation frequency associated with the control signal ($p2$, $p5$) which substantially blocks the passage of other frequencies.

2 Claims, 2 Drawing Figures

CIRCUIT ARRANGEMENT FOR THE WIRELESS TRANSMISSION OF CONTROL SIGNALS TO THE CONTROL PATHS OF CONTROLLED SEMICONDUCTOR VALVES

BACKGROUND OF THE INVENTION

1. Field of the Invention

The invention concerns a circuit arrangement for the wireless transmission of control signals to the control paths of controlled semiconductor valves, particularly of thyristors, which are preferably used in a rectifier for high voltage. Specifically the invention concerns firing of thyristors used in a high voltage rectifier circuit by means of modulated control signals from a transmitter which are received by receivers associated with each thyristor.

2. Description of the Prior Art

Such a circuit arrangement, which is known from the Swiss Pat. No. 413,933, is to be used particularly in a rectifier circuit which is intended for the conversion of high voltages.

This prior art circuit arrangement has a high-frequency transmission signal, onto which the information of the control signals is amplitude modulated. The carrier frequency of the transmission signal is 1 MHz. In the absence of further data, the modulation involved here may be frequency as well as amplitude modulation. Tuned circuits are specifically used as the high-frequency receivers in the known circuit arrangement. The coils of the individual tuned circuit are inductively coupled to the coil of the high-frequency transmitter. Thus, near-field coupling is involved which is disadvantageous for high voltages: On the one hand, the mutual distance must be small, so that a firing signal of sufficient strength is available at the semiconductor valves, and on the other hand, the mutual distance must be large, so that no corona discharges occur. The contradictory requirements are an obstacle to a practical design of the prior art circuit arrangement with tuned-circuit coils.

It is an object of the invention to provide a circuit that is reliable and achieves interference-proof firing of the semiconductor valves, with a considerable distance between the high-frequency transmitter and the high-frequency receiver, if high voltages are present at the semiconductor valves.

SUMMARY OF THE INVENTION

According to the invention, this objective is met by providing as the high-frequency transmitter a fequency-modulated high-frequency transmitter, whose carrier frequency is in the range of 10 MHz to 50 GHz and whose transmitting antenna is provided with a reflector which is pointed toward receiving antennas with which the individual high-frequency receivers are equipped. The demodulator associated with each high-frequency receiver comprises a filter which is tuned to the modulation frequency assigned to the control signal and largely blocks the passage of other frequencies.

In the circuit arrangement according to the invention, a large potential difference between the control signal transmitter and the semiconductor valves does not matter, because a considerable distance in space can exist between them. The distance between them is bridged by the wireless high-frequency transmission paths with firing signals of sufficient strength. In order to obtain maximum power transmission, the transmitting antenna of the high-frequency transmitter is provided with a reflector which is trained to the receiving antenneas of the high-frequency receivers.

The carrier frequency should be one of the so-called industrial frequencies, so that other receivers are not interfered with in an unreliable manner.

The preferred procedure may be to provide for the energy supply of the high-frequency receiver and/or for obtaining the firing energy from the voltage at the anode-cathode path of the semiconductor valve.

DESCRIPTION OF THE INVENTION

Figure 1:
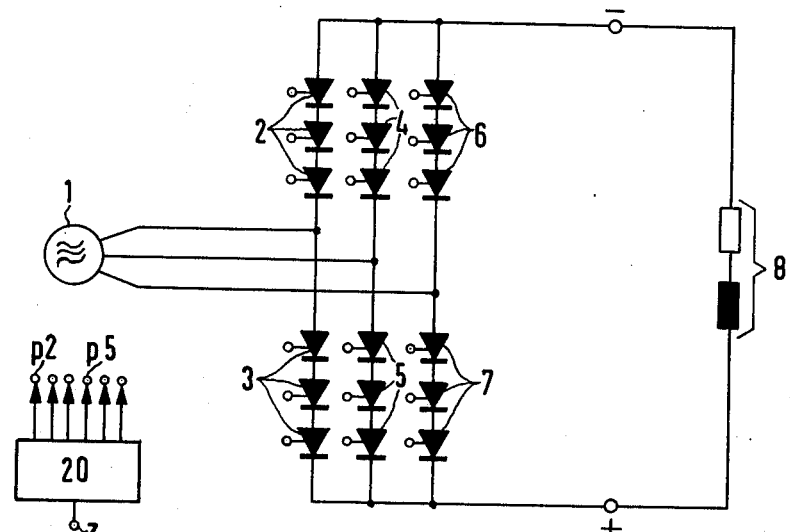
FIG. 1 shows a prior art rectifier with controlled semiconductor valves in a bridge circuit, which is provided for rectification of a high voltage.

In the prior art arrangement of FIg. 1, a three-phase a-c voltage source 1 is applied to a load 8 by way of a rectifier with controlled semiconductor valves 2 to 7 in a three-phase bridge circuit. The a-c voltage source 1 delivers a high-voltage a-c voltage. Its peak value may be, for instance, one million volts. To control this high voltage, each branch of the three-phase bridge consists of a multiplicity of semiconductor valves 2 to 7, of which only three semiconductor valves are shown in each branch. In this case, the rectifier is directly connected to the load 8. Deviating therefrom, the rectifier can also be provided for high-voltage d-c transmission, where it is connected to an inverter which, in turn, is connected to a load. The individual semiconductor valves 2 to 7 are fired by control signal on terminals $p2$ to $p7$, which are supplied by a control signal generator 20. The control signal generator 20 is addressed by a control voltage $z$, which may be formed, for instance, in a control circuit (not shown) for resetting the ignition angle. The control signals $p2$ to $p\ 7$ assure that the individual semiconductor valves 2 to 7 are fired in a predetermined sequence and at a predetermined frequency.

Figure 2:
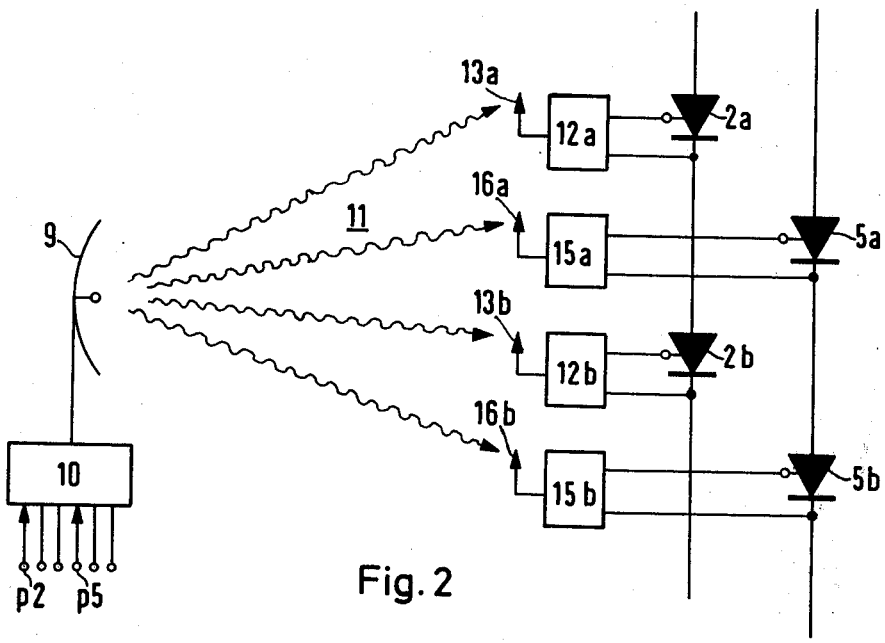
FIG. 2 shows a circuit arrangement according to the invention for the wireless transmission of control signals to the control paths of several semiconductor valves of this rectifier.

As can be seen from FIG. 2, the transmission of the six control signals $p2$ to $p5$ to the control paths of the semiconductor valves 2 to 7 is accomplished by radiation means through a high-frequency transmission channel. In order to facilitate the understanding, only the semiconductor valves $2a$ and $2b$ will be considered for the time being that belong to the same branch in the rectifier and are to be connected in series with each other.

According to FIG. 2, the control signal $p2$ for the semiconductor valves $2a$, $2b$ is applied to a high-frequency transmitter 10, which is equipped with a transmitting antenna 9. The transmitting antenna 9 is provided with a reflector. The transmitting antenna 9 is stationary; it may, for instance, be fastened in the wall of a building.

The high-frequency transmitter 10 delivers an output signal, whose carrier frequency is, for instance, 2.45 GHz. Amplitude modulation is effected here by the control signal $p2$ applied to the modulator input. If the control signal $p2$ is different from zero, the carrier frequency $f0$ is amplitude-modulated with a modulation frequency $f2$ of, say, 10 MHz. The transmitting antenna then radiates a transmission signal 11 which contains, besides the carrier frequency $f0$, also the frequencies ($f0+f2$). The transmission signal is radiated by the transmitting antenna 9 in a parallel beam or, as shown, radially toward the semiconductor valves 2a, 2b.

At some distance from the transmitting antenna are the high-frequency receivers 12a, 12b, each of which is associated with one of the semiconductor valves 2a, 2b. Their receiving antennas 13a and 13b are facing toward the transmitting antenna 9, so that the transmitted signal 11 can be received with maximum strength. The high-frequency receivers 12a, 12b are of the same design. Each contains a demodulator, whose output signal is applied, possibly by way of a flipflop and/or a firing circuit, to the control path of the associated semiconductor valve 2a or 2b. The combination of a rectifier with a filter tuned to the modulation frequency $f2$ serves as the demodulator. The high-frequency receivers 12a, 12b therefore function selectively, so that other frequencies cannot exert an interfering influence. As soon as a control signal $p2$ is present at the modulation input of the high-frequency transmitter 10, the two semiconductor valves 2a, 2b are fired. The firing information is transmitted by the high-frequency transmission signal 11 regardless of potential. Large potential differences between the high-frequency transmitter 10 and the semiconductor valves 2a, 2b thus have no detrimental effect.

It can furthermore be seen from FIG. 2 that two further semiconductor valves 5a, 5b are provided, which are likewise to be connected in series. These semiconductor valves 5a, 5b belong to another branch of the rectifier than the semiconductor valves 2a, 2b. It should be noted that the high-frequency transmitter 10 is provided, on the one hand, for the wireless control signal $p2$. The semiconductor valves 5a, 5b are therefore to be fired at other points in time than the semiconductor valves 2a, 2b. This further control signal $p5$ assures, if it is different from zero, that the carrier frequency $f0$ of the high-frequency transmitter 10 is modulated with another modulation frequency $f5$, which may, for instance, be 20 MHz. The transmitted signal 11 then has the frequency ($f0\pm f5$).

With each of these semiconductor valves 5a, 5b is likewise associated a high-frequency receiver 15a, 15b with the receiving antennas 16a, 16b. These high-frequency receivers 15a, 15b have the same design as the high-frequency receivers 12a, 12b, but their demodulators are not tuned to the modulation frequency $f$, but to the modulation frequency $f5$. They therefore pass on a firing signal to the semiconductor valves 5a, 5b only if the transmitted signal has a component with the modulation frequency $f5$. The transmission of other frequencies through the filter is largely blocked, so that unintended firing is practically impossible.

Through the use of selective demodulators it is achieved that in spite of using only a single high-frequency transmission channel, each of the control signals is correlated to the proper semiconductor valve.

The firing arrangement within the high-frequency receivers 12a, 12b and 15a, 15b can be designed, in a manner known per se, in such a manner that it obtains the firing energy required for firing from the reverse voltage at the respective semiconductor valve 2a, 2b, 5a, 5b. One can proceed here then so that these reverse voltages are used also for the power supply of the high-frequency receivers 12a, 12b, 15a, 15b.

What is claimed is:

1. A circuit arrangement for the wireless transmission of control signals to the control paths of controlled semiconductor vavles such as thyristors used in a rectifier for high voltage, said semiconductor valves including a first group of controlled semiconductor valves arranged for simultaneous firing in response to a first control signal and a second group of control semiconductor valves similarly arranged to be simultaneously fired by in response to a second control signal occurring at a time different from said first control signal with first and second intermediate frequency modulation frequencies associated respectively with said first and second control signals, a high frequency common to both groups being provided for transmitting a signal having a high frequency carrier modulated by said first and second intermediate frequency modulation frequencies in dependent on said first and second control signals comprising:
   a. a first group of high frequency receivers disposed remotely from said high frequency transmitter each including a demodulator tuned to said first modulation frequency and providing an output to the control path of a semiconductor valve in said first group of controlled semiconductor valves;
   b. a second group of high frequency receivers similarly remotely located from said high frequency transmitter and each containing a demodulator tuned to said second modulation frequency providing an output signal to the control path of a semiconductor valve from said second group of controlled semiconductor valves;
   c. a high frequency transmitter including a transmitting antenna equipped with a reflector and means to train said reflector in the direction of said individual high frequency receivers, said high frequency transmitter being a frequency modulated high frequency transmitter having a carrier frequency in the range of 10 mhz to 50 ghz; and
   d. wherein the demodulators in each of said high frequency receiver comprises a filter tuned to demodulate the frequency associated with its control signal and to substantially block the passage of other frequencies.

2. Apparatus according to claim 1 wherein said high frequency receivers are disposed in direct and physical proximity to their associated seimconductor valves.

* * * * *

UNITED STATES PATENT AND TRADEMARK OFFICE
CERTIFICATE OF CORRECTION

PATENT NO. : 3 946 389
DATED : March 23, 1976
INVENTOR(S) : Adolf Haböck et al

It is certified that error appears in the above-identified patent and that said Letters Patent are hereby corrected as shown below:

In column 1, line 52, change "fequency" to --frequency--

In column 3, line 51, after the letter "f" insert the number --2--

In column 4, line 29, claim 1, change "dependent" to --dependence--

Signed and Sealed this twenty-ninth Day of June 1976

[SEAL]

Attest:

RUTH C. MASON
Attesting Officer

C. MARSHALL DANN
Commissioner of Patents and Trademarks